(12) United States Patent
Schantz et al.

(10) Patent No.: US 7,975,929 B1
(45) Date of Patent: Jul. 12, 2011

(54) OPTICAL SIGNATURE SYSTEM AND METHOD

(75) Inventors: Howard J. Schantz, Inver Grove Heights, MN (US); Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 507 days.

(21) Appl. No.: 12/146,810

(22) Filed: Jun. 26, 2008

(51) Int. Cl.
*G06K 19/06* (2006.01)
(52) U.S. Cl. ........................................ 235/494; 235/491
(58) Field of Classification Search .................. 235/454, 235/491, 494
See application file for complete search history.

(56) References Cited

U.S. PATENT DOCUMENTS

| 7,184,622 | B2 | 2/2007 | Uhlhorn et al. |
| 7,353,994 | B2 * | 4/2008 | Farrall et al. .................. 235/454 |

OTHER PUBLICATIONS

Co-pending U.S. Appl. No. 12/146,836, filed Jun. 26, 2008.

* cited by examiner

*Primary Examiner* — Daniel A Hess
(74) *Attorney, Agent, or Firm* — Hamre, Schumann, Mueller & Larson, P.C.

(57) ABSTRACT

A system and method for creating a unique optical signature that use an unstructured, random arrangement of objects, such as optical beads. Disturbance of the arrangement of the objects irreversibly changes the unique optical signature that is created, effectively preventing replication of the unique optical signature if the arrangement of the objects is disturbed. The disturbance and resulting destruction of the optical signature can occur without the application or presence of electrical power.

27 Claims, 2 Drawing Sheets

OPTICAL SIGNATURE SYSTEM AND METHOD

FIELD

This disclosure relates to a system and method for creating a unique optical signature.

BACKGROUND

There are many different applications for unique signatures or identifiers. For example, a unique signature can be used to uniquely identify a specific physical object within a group. One example of the use of a unique signature is a unique number that is calculated and assigned to a piece of electronic equipment. If that unique number is not recalculated correctly upon attempted operation of the electronic equipment, thereby indicating possible tampering with the equipment, then the electronic equipment is not allowed to operate. Another area of use of a unique signature is in encryption technology in which a unique encryption key is generated and stored in non-volatile random access memory.

In certain applications, particularly high security applications, it is important to prevent unauthorized access to the unique signature in order to prevent duplication or replication of the signature that can, for example, be used to gain unauthorized access to sensitive data or allow unauthorized use of equipment. In the case of current encryption technology, the encryption key is intended to be erased from memory if an unauthorized person tries to access the encryption key. However, this active erasure approach requires active power or a battery source, which is not necessarily always present. Additionally, the erasure timeline of an active erasure approach may be too long for some application environments.

SUMMARY

A system and method are described for creating a unique optical signature that uses an unstructured, random arrangement of objects. Disturbance of the arrangement of the objects irreversibly changes the unique optical signature that is created, effectively preventing replication of the unique optical signature if the arrangement of the objects is disturbed. The disturbance and resulting destruction of the optical signature can occur without the application or presence of electrical power.

The unique optical signature is created by directing light through the unstructured, random arrangement of objects, and detecting the unique optical signature that is produced by the objects as a result of the light being directed through the arrangement of objects. Because the arrangement of the objects is unstructured and random, the optical signature that results is unique to that arrangement. Disturbance of the arrangement will change the light path through and past the objects, thereby changing the resulting optical signature.

The resulting unique optical signature can be used in any of a large number of applications including, but not limited to, the construction of an encryption key or uniquely identifying an object such as an electronic device. Any application that would benefit from using a unique signature could utilize the system and method described herein.

In one embodiment, an optical signature system includes at least one light source, at least one optical signature chamber defining an interior space containing a plurality of discrete, non-uniform, randomly disposed objects in relatively fixed but changeable positions with respect to each other that create a unique optical signature, and an optical signature detector that electrically detects the unique optical signature produced by the optical signature chamber as a result of light from the light source being directed through the optical signature chamber.

The detected optical signature can then be processed, for example by comparing the resulting light pattern with a stored pattern to determine if there is a match, or by comparing a value representative of the intensity of the detected signature with a stored intensity value.

If only a single optical signature chamber is used, the optical signature produced by the single optical signature chamber is unique and forms the unique optical signature of the system. If a plurality of optical signature chambers are used, each signature chamber produces a unique, individual optical signature which together form an overall resulting unique optical signature of the system. In some circumstances, the optical signatures produced by the plurality of optical signature chambers may continue to interact and interfere with each other as they exit their respective optical chambers before forming a resulting optical signature of the system, which provides further uniqueness.

To create an encryption key, for example, a plurality of the optical signature chambers can be used, each chamber containing its own plurality of discrete, non-uniform, randomly disposed objects in relatively fixed but changeable positions with respect to each other that create a unique optical signature for each chamber. If the detected optical signature of each chamber is determined to be valid, a correct key is generated that can be used to encrypt/decrypt data.

DRAWINGS

DETAILED DESCRIPTION

Figure 1:
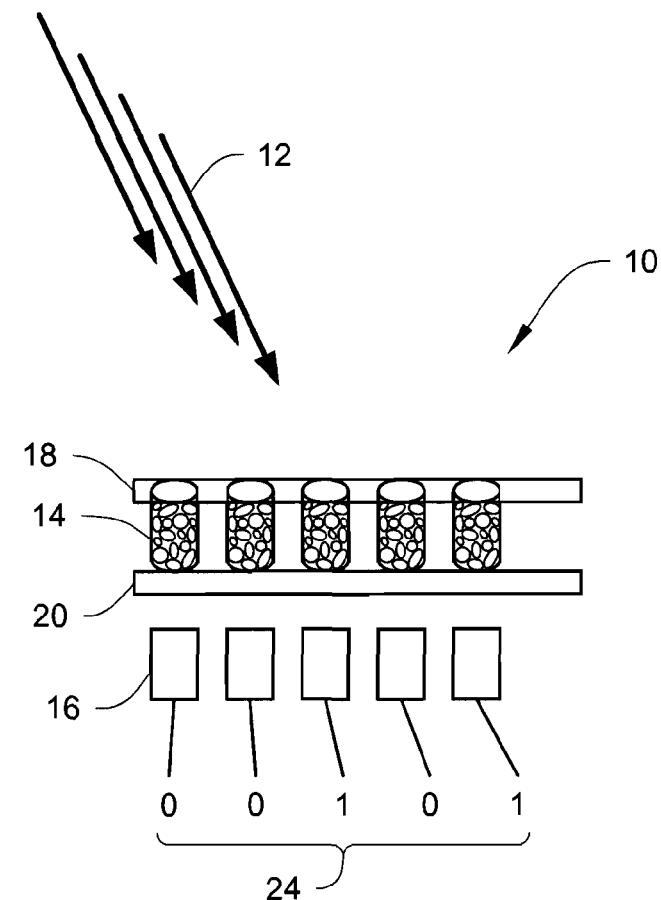
FIG. 1 depicts an optical signature system.

With reference to FIG. 1, an optical signature system 10 is illustrated. The system 10 includes at least one light source 12, at least one optical signature chamber 14, and at least one optical signature detector 16. The light source 12 is intended to direct light into and through the chamber 14 which is designed to create a unique optical signature as a result of refraction and/or reflection of the light as the light passes through the chamber. The optical signature can be the resulting pattern of light or portion of the pattern emerging from the chamber 14, the intensity of one or more pixels of light emerging from the chamber 14, or any other measure of the light emerging from the chamber 14. The detector 16 is designed to detect the resulting unique optical signature produced by the chamber 14 as the light emerges from the chamber. The detector 16 may resolve a single point or an array of points and will accept light from at least one optical signature chamber. The detector 16 can be, for example, a pin diode which receives one or more pixels of light and produces a single intensity output, or a charge-coupled device (CCD) which receives a plurality of pixels of light and produces an array of values as an output, i.e. an image, each relating intensity or color.

As used herein, the optical signature produced by each optical signature chamber 14 will be referred to as a unique, individual optical signature. In the case of a single optical signature chamber 14, the optical signature produced by the single optical signature chamber is unique and forms the unique optical signature of the system. In the case of a plurality of optical signature chambers 14, each signature chamber produces a unique, individual optical signature which together form an overall resulting unique optical signature of the system 10. In some circumstances, the light waves emerging from the individual optical signature chambers 14 may continue to interact and interfere with each other as they exit the optical chambers, and it is the result of the interfering and interacting light waves that is detected and forms the resulting optical signature of the system.

Figure 2:
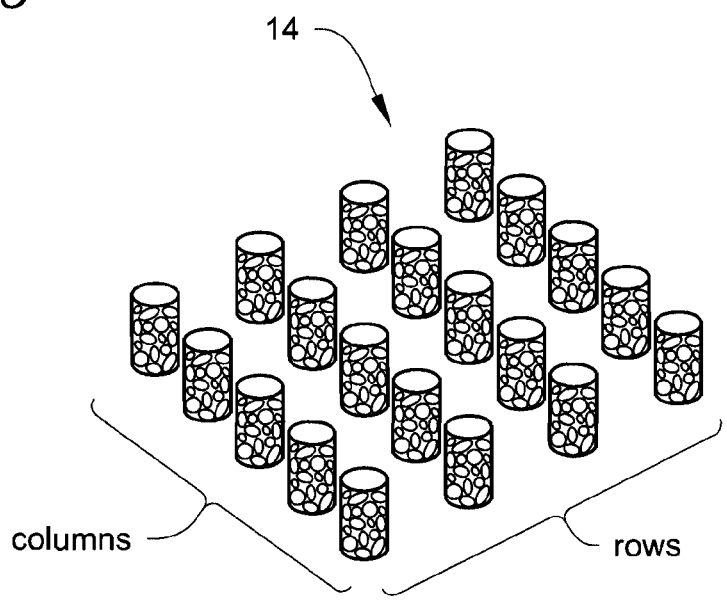
FIG. 2 is a top perspective view of a plurality of optical signature chambers arranged into an array.

In the illustrated embodiment, a plurality of chambers 14 are provided, each chamber providing its own unique optical signature. The number of chambers 14 and the arrangement of the chambers in a pattern or array can vary based on a number of factors, including the particular security application and how many different individual optical signatures need to be created. The chambers 14 are arranged adjacent to one another so as to receive the light from the light source 12. As shown in FIG. 2, the chambers 14 can be arranged into a pattern, for example an array of rows and columns, for example four rows and five columns. However, the concepts described herein can be applied to a system using a single chamber 14. Therefore, this disclosure and the claims, unless indicated otherwise, are intended to encompass a system with a single chamber or a plurality of chambers.

Covers 18, 20 can be provided over the ends of the chambers 14 to close off the ends of the chambers 14. The covers 18, 20 are designed to allow passage of light waves into and from the chambers 14. The covers 18, 20 can be, for example, made of a material that permits passage of the light, such as clear glass. Alternatively, the covers 18, 20 can be light transmissive only in the locations where they directly cover the chambers.

A single or multiple light sources 12 can be used for directing light into the chamber(s) 14. In the illustrated embodiment, the light source(s) 12 and the chambers 14 are arranged so that the light enters through a longitudinal end of the chambers, and exits through an opposite longitudinal end. If multiple light sources are used, there can be one light source for each chamber 14 or multiple chambers can share a common light source. The light provided by the light source 12 is preferably visible light, more preferably monochromatic light, for example coherent light from a laser. However, in certain applications, other types of visible light, such as white light, could be used. In addition, non-visible light, for example infra-red light, could be used. Any light source that provides a light wave that can be detected by a suitable optical detector 16 after passing through the signature chamber(s) 14 can be used.

The number and type of detectors 16 used corresponds to, for example, the uniqueness required for the application. The detectors 16 can be any optical detector that can detect the light that emerges from at least one chamber 14. In the illustrated embodiment, there is at least one detector 16 for each chamber 14. It is to be realized that each sensor can receive light that emerges from its associated chamber, as well as light that emerges from adjacent chambers. Each detector 16 can be of a type that produces a single bit of information, such as a pin diode. Alternatively, the detectors 16 can be, for example, CCD imaging sensors which can generate an array of values corresponding to a variation in intensity and color, i.e. a light image.

The chambers 14 can be any container defining an interior space, and, in the illustrated embodiment, are open at each end. In one embodiment, each chamber 14 comprises a glass cylinder with open ends. The chamber(s) can be designed to break under certain conditions, such as application of sufficient mechanical force.

Figure 3:
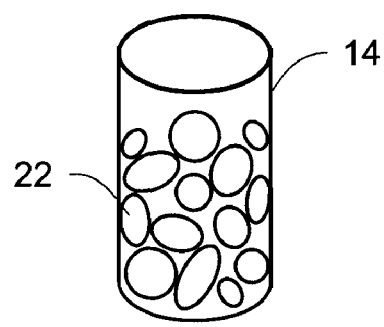
FIG. 3 is a detailed view of an optical signature chamber used in FIGS. 1 and 2.

With reference to FIG. 3, each chamber 14 contains a plurality of discrete, non-uniform, randomly disposed objects 22 in relatively fixed but changeable positions with respect to each other that create a unique optical signature when light from the light source is directed therethrough. Non-limiting examples of the objects 22 are discussed below.

Relatively fixed means that during normal use the objects retain their positions relative to each other. However, those relative positions are changeable upon the occurrence of an event including, but not limited to, attempted tampering with the chamber(s) 14 or upon application of sufficient force to the chamber(s) that destroys the chamber(s), which thereby alters the resulting optical signature that is created by the chamber(s). For sake of convenience, any event that causes the relative positions of the objects to change will be described herein as a destructive event.

The objects 22 used are preferably discrete from each other during normal use. In other words, the objects 22 are separate or separable from one another although they may be in abutting contact, which facilitates changing of the relative positions. During normal operating condition, the objects 22 can also be described as being separable from each other or non-fusible. Although a number of different words can be used to describe the discrete, separate objects, the goal is to have the objects spill from the chambers 14 during a destructive event and randomly mix with objects spilled from the other chambers.

The objects 22 in each chamber 14 also have non-uniform or differing optical properties. These optical properties can include, for example, indices of refraction, opacity, and wavelength filtering or combinations thereof. The differing optical properties can be provided in a number of ways, including, but not limited to, using objects of differing sizes, shapes, materials, colors and the like. Thus, the term non-uniform can refer to non-uniformity of the optical properties, or simply non-uniformity in a structural and/or material configuration that results in the non-uniformity of the optical properties. When each chamber 14 is filled with the objects 22, the resulting non-uniformity of the objects creates the unique signature when the light is passed through the chamber. The objects are preferably solid so that they do not change shape, and thus their optical properties, during normal use.

Further, when the chambers are filled, the objects 22 in each chamber 14 have random positions and orientations within the chamber. However, the chambers 14 are filled such that the positions and orientations of the objects during normal use are maintained. Thus, in one embodiment, the chambers can be completely filled in a tightly packed configuration whereby regardless of the orientation of the chambers (i.e. vertical, horizontal, angled, etc.) the positions and orientations of the objects in the chambers are maintained. In another embodiment, the chambers are only partially filled. Thus, if the orientation of the chambers is altered sufficiently (for example by tilting the chambers from a vertical orientation shown in FIG. 1 to a horizontal orientation), the positions and/or orientations of the objects can change, thereby altering the resulting optical signatures.

The objects 22 can comprise a number of different forms. In one embodiment, the objects 22 are beads, such as optical beads, made of any suitable material such as glass and having any suitable shape, such as generally spherical. The objects could also be marbles or marble-like objects. Thus, in these two non-limiting examples, the chambers would somewhat resemble jars full of marbles.

Preferably, the objects are non-fusible over normal operating conditions to maintain their separable conditions. Further, the objects are preferably optically stable so as to maintain their optical properties over time. Nonetheless, the objects can be designed to degrade or change in some manner when exposed to certain operating conditions to alter their optical properties. For example, the optical properties of the objects can be designed to change when the chambers are exposed to certain environmental conditions, such as temperature or humidity extremes or when exposed to x-rays, or operational conditions, such as vibration or shock extremes.

Returning to FIG. 1, in one exemplary operational use of the system 10, the unique, individual optical signatures of the chambers are first established by the detectors 16 and the signatures saved in a suitable storage device such as random access memory of a data processing device. This establishes the unique fingerprint of the device 10 and the machine, mechanism, device, etc. that the device 10 is used with.

During operational use, the unique optical signature of the chambers 14 is detected by the detectors 16. For example, as discussed above, the detectors 16 can detect the light images produced by the chambers, which images are then compared to the expected light images which have previously been stored. If the light images match the stored images, a key bit sequence 24 can be created which is then compared to an expected key bit sequence to determine a match. If one or more of the detected light images does not match a stored image, the correct key bit sequence is not generated. Thus, an action or operation of equipment can be prevented, and/or a suitable notification can be sent warning of the error. In another embodiment, the generated key bit sequence can be inserted directly into a decryption algorithm. The failure to decrypt correctly would result in an inoperable equipment state.

The comparison of the detected optical signature to the expected optical signature can also be used as a simple go/no-go tool without creating a key bit sequence, whereby if there is a match an action can be permitted to take place or equipment allowed to operate. Conversely, if there is not a match, the action or operation of equipment can be prevented, and/or a notification can be sent warning of the error.

Instead of detecting a light image, the detectors can detect a light intensity of each chamber and compare the detected light intensity with a previously stored expected light intensity.

In addition, rather than comparing the detected optical signature(s) to a stored optical signature(s), the detected optical signature can be used as an input for another process. For example, the detected optical signature of one chamber or of the entire system can be represented in the digital world as a plurality of 1's and 0's as suggested by the key bit sequence 24. The 1's and 0's representing the detected optical signature can be fed into a random number generator which processes the numbers to create a code that is used to encrypt data that is sent to another location which must have the correct code to decrypt the data.

Figure 4:
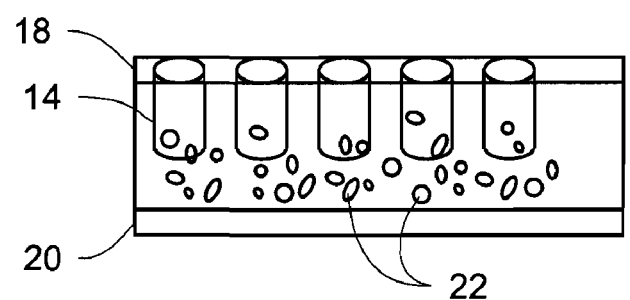
FIG. 4 illustrates the objects of the signature chambers spilled from the chambers and mixed together which destroys the signature.

If a destructive event occurs, the relative positions of the objects changes. If the objects simply shift within the chambers because the chamber is not tightly packed or because shifting occurs for another reason, the optical signature is destroyed. If the objects spill from the chambers as shown in FIG. 4 and mix with objects from other chambers, destruction of the optical signature is even more complete. Due to the initial randomness and non-uniformity of the objects within each chamber, recreation of the exact arrangement of the objects that produces the exact same optical signature is essentially impossible. Therefore, destruction of the optical signature can be achieved by altering the relative positions of the objects. Such destruction can be performed mechanically or manually, without the need for electric power.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical signature system, comprising:
   at least one light source;
   at least one optical signature chamber defining an interior space containing a plurality of discrete, non-uniform, randomly disposed objects that create a unique optical signature, the objects in the optical signature chamber loosely rest in one physical arrangement with relative positions between the objects remaining fixed when the objects are not disturbed by a destructive event and the relative positions of the objects are changeable from the one physical arrangement by a destructive event; and
   an optical signal detector that electrically detects the unique optical signature of the optical signature chamber as a result of light from the light source being directed through the optical signature chamber.

2. The optical signature system of claim 1, wherein the objects have non-uniform optical properties.

3. The optical signature system of claim 2, wherein the non-uniform optical properties comprise non-uniform indices of refraction.

4. The optical signature system of claim 1, comprising a plurality of the optical signature chambers, each chamber defining an interior space containing a plurality of discrete, non-uniform, randomly disposed objects that create a unique optical signature.

5. The optical signature system of claim 4, wherein the optical signature chambers are arranged into a pattern comprising an array of rows and columns.

6. The optical signature system of claim 4, comprising a plurality of the optical signature detectors, each optical signature detector is positioned to simultaneously detect light exiting from a plurality of the optical signature chambers after the light has passed through the optical signature chambers from the at least one light source.

7. The optical signature system of claim 1, wherein the light source produces coherent light.

8. The optical signature system of claim 1, wherein the objects are optical beads.

9. The optical signature system of claim 1, wherein the optical signature chamber has a first end and a second end, the light source is positioned so that light therefrom enters the optical signature chamber through the first end, and the optical signal detector is positioned to detect light that exits the optical signature chamber through the second end.

10. An optical signature chamber, comprising:
    a structure having first and second open ends and an interior space; and
    a plurality of discrete, non-uniform, randomly disposed objects in the interior space that create a unique optical signature, the objects in the interior space loosely rest in one physical arrangement with relative positions between the objects remaining fixed when the objects are not disturbed by a destructive event and the relative positions of the objects are changeable from the one physical arrangement by a destructive event.

11. The optical signature chamber of claim 10, wherein the objects have non-uniform optical properties.

12. The optical signature chamber of claim 11, wherein the non-uniform optical properties comprise non-uniform indices of refraction.

13. The optical signature system of claim 10, wherein the objects are optical beads.

14. A method of generating a unique optical signature, comprising:

directing light through at least one optical signature chamber defining an interior space containing a plurality of discrete, non-uniform, randomly disposed objects, the objects in the optical signature chamber loosely rest in one physical arrangement with relative positions between the objects remaining fixed when the objects are not disturbed by a destructive event and the relative positions of the objects are changeable from the one physical arrangement by a destructive event;

electrically detecting light that has been directed through the optical signature chamber, the detected light forming a unique optical signature; and processing the detected light.

15. The method of claim 14, wherein the objects have non-uniform optical properties.

16. The method of claim 15, wherein the non-uniform optical properties comprise non-uniform indices of refraction.

17. The method of claim 14, wherein the objects are optical beads.

18. The method of claim 14, comprising providing a plurality of the optical signature chambers, each chamber defining an interior space containing a plurality of discrete, non-uniform, randomly disposed objects.

19. The method of claim 18, comprising directing light through each of the optical signature chambers.

20. The method of claim 18, wherein the optical signature chambers are arranged into a pattern comprising an array of rows and columns, and comprising determining whether the optical signatures of the optical signature chambers in the array match stored optical signatures.

21. The method of claim 18, comprising providing a plurality of optical signature detectors, and positioning each optical signature detector to simultaneously detect light exiting from a plurality of the optical signature chambers after the light has passed through the optical signature chambers.

22. The method of claim 14, wherein the light is coherent light.

23. The method of claim 14, wherein detecting light comprises detecting an image.

24. The method of claim 23, further comprising comparing the detected image to a stored image.

25. The method of claim 14, comprising using the detected optical signature as an input for another process.

26. The method of claim 14, wherein processing the detected light comprises generating a key bit sequence.

27. The method of claim 14, wherein the optical signature chamber has a first end and a second end; directing light comprises directing light through the first end of the optical signature chamber; and electrically detecting light comprises electrically detecting light that exits the optical signature chamber through the second end.

* * * * *